United States Patent [19]
Walter et al.

[11] 3,998,502
[45] Dec. 21, 1976

[54] FLUID BEARING SYSTEM

[75] Inventors: Lothar Walter, Schweinfurt; Rainer Schurger, Arnstein, both of Germany

[73] Assignee: SKF Industrial Trading & Development Co., Amsterdam, Netherlands

[22] Filed: May 19, 1975

[21] Appl. No.: 578,498

Related U.S. Application Data

[62] Division of Ser. No. 409,704, Oct. 25, 1973, Pat. No. 3,934,947.

[30] Foreign Application Priority Data

Oct. 26, 1972 Germany .......................... 2252495

[52] U.S. Cl. .............................. 308/9; 308/DIG. 1
[51] Int. Cl.² ....................................... F16C 32/06
[58] Field of Search ................. 308/DIG. 1, DIG. 9, 308/72

[56] References Cited

UNITED STATES PATENTS

| | | | |
|---|---|---|---|
| 2,756,114 | 7/1956 | Brunzel | 308/9 |
| 2,932,542 | 4/1960 | Smith | 308/9 |
| 3,110,525 | 11/1963 | Sternlicht | 308/9 |
| 3,827,767 | 8/1974 | Sinner | 308/9 |

FOREIGN PATENTS OR APPLICATIONS

11,311   5/1913   United Kingdom .................. 308/9

*Primary Examiner*—Robert W. Saifer

[57] ABSTRACT

A fluid bearing system for journalling a rotatable shaft in which an annular housing is fixed about the shaft and is provided with an inlet for the supply of fluid under pressure. At least one bearing compression chamber is formed in the housing and/or the shaft and is distributed about the periphery of the shaft. The housing and the shaft form an integrated throttle control means in which a restrictor opening and a discharge opening is formed between the housing and the shaft for the flow through of fluid from the inlet. The openings are simultaneously varied relative to each other in an opposing manner as a function of the size and distribution of the load placed on the shaft.

7 Claims, 13 Drawing Figures

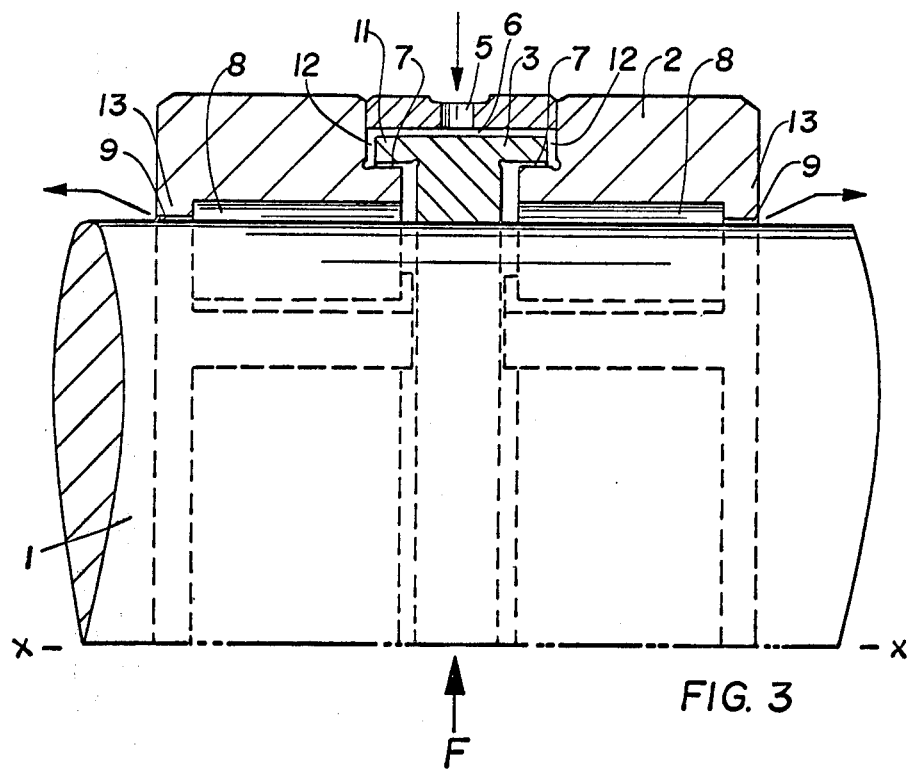
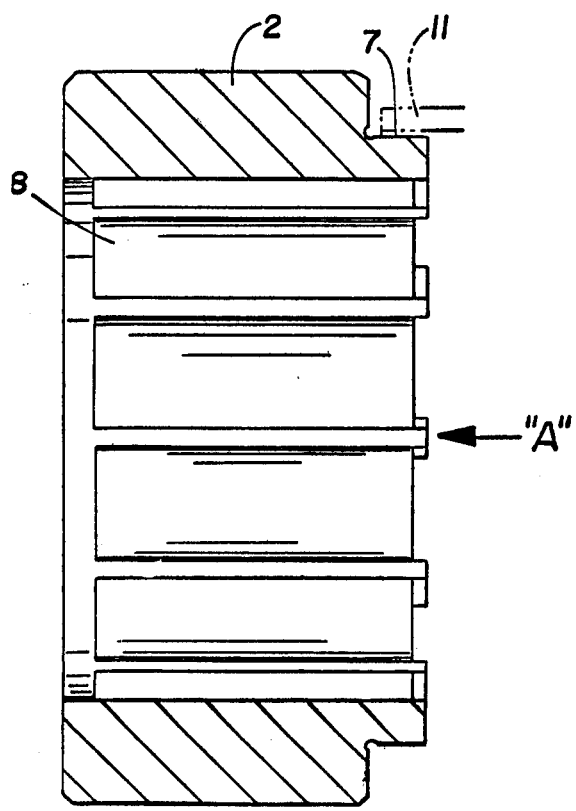
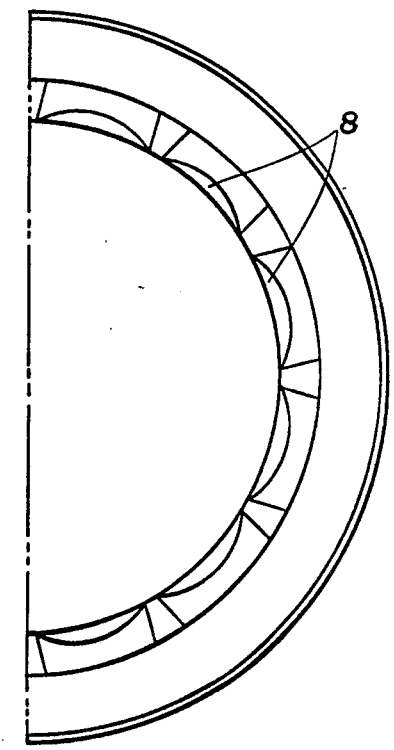
FIG. 3
FIG. 3a
FIG. 3b

FLUID BEARING SYSTEM

The present application is a Divisional of Ser. No. 409,704, filed Oct. 25, 1973 now U.S. Pat. No. 3,934,947.

BACKGROUND OF THE INVENTION

The present invention relates to a fluid bearing for journalling shafts and in particular to a hydrostatic and/or aerostatic radial and axial load carrying bearings.

Fluid bearings are commonly employed to journal high speed rotary shafts such as yarn spinning or twisting spindles. In general such bearings comprise an outer shell or housing which defines with the shaft one or more compression pockets distributed about the periphery of the shaft into which a fluid under pressure is supplied. Shifting of the shaft under either radial or axial loads displace pressurized fluid so that an increasing pressure is created in the compression pocket. In order to stabilize the shaft it is necessary to control the flow of fluid into the pocket and out of the pocket so as to increase and reduce the flow in dependence of the load shifting. It is well known to form fluid bearings in such a way that only one conduit is needed to supply the pressure medium to the bearing. Consequently, only one pump is needed. In such bearings, in order to obtain a given rigidity and supporting capacity, it is customary to incorporate within the housing a fixed or constant throttling means as for instance a diaphragm, a jet nozzle, or a capillary tube. Such fixed throttling means controls the inlet of fluid. This type of bearing, owing to its low constructional outlay and cost, are relatively cheap to manufacture. On the other hand they have the drawback that the load carrying capacity and the bearing rigidity, obtained during operation are not very high.

Bearings, which have only one pump to pressurize the oil or fluid supply, also includes those in which restrictor and discharge valves are arranged outside the bearing. In this manner the resistance to the movement of fluid through the bearing can be adjusted manually. Since the restrictor resistance remains constant during operation even in this type of bearing, this measure does not furnish any appreciable improvement in the rigidity of the bearing. A further drawback lies in the fact that a bearing having a plurality of compression pockets or compartments requires a conduit tube running from each restrictor valve point to each of the pockets. In the case of a spindle bearing in general use, an average of ten such conduits are needed.

It has been also well known to furnish each bearing compression pocket with an individual pump of its own. With this system, higher bearing rigidity and carrying capacity can be obtained. At the same time, however, a great outlay in cost is required for the pump, fluid conduits and other supply installations.

Finally, fluid bearings have become known in which throttling valves responsive to load conditions have been provided. With this system high bearing rigidity and carrying capacity can likewise be obtained. The outlay in cost and the number of parts is still relatively high and is not much of an improvement over those bearings in which a pump is supplied for each bearing compression compartment. Furthermore, in both last mentioned systems there is a greater liability for breakdown of the entire bearing and running behavior is very difficult to predict mathematically.

It is an object of the present invention to provide a fluid bearing system overcoming the defects and disadvantages of the known prior art bearings.

It is a further object of the present invention to provide a fluid bearing system having need for only one pump or one source of fluid under pressure and employing fixed throttling means integrated within the bearing itself.

It is still another object of the present invention to provide a fluid bearing system having a increased load capacity and rigidity.

It is another object of the present invention to provide a fluid bearing system which is suitable for radial and/or axial load conditions.

It is another object of the present invention to provide a fluid bearing system employing a choke or throttling valve means directly responsive to load conditions and which means comprises restrictor entrance and discharge openings into the compression chamber so that the same may be varied in dependence upon actual movement of the shaft.

These objects, other objects, and numerous advantages will be apparent from the following disclosure.

SUMMARY OF THE INVENTION

According to the present invention a fluid bearing system (hydro or aero static) for rotary shafts is provided by arranging a housing about the shaft and forming within the housing or the shaft at least one bearing compression pocket distributed about the periphery of the shaft. And by providing the housing and shaft with an integrated bearing control device defining a restrictor gap for the introduction of the fluid to the bearing compression pocket and a discharge gap for the outward flow of fluid from the compression pocket. The restrictor gap and the discharge gaps provide openings which are automatically enlarged or reduced in an opposite manner simultaneously with the load placed on the shaft and as a direct function of the size and direction of the load.

Since an external load causes a relative shift between the shaft and the housing, the size of the discharge gap of the compression pocket is reduced in the direction of the load. In this way there is produced an increased resistance to the outward flow of fluid and at the same time a large drop in pressure in the bearing discharge gap. This is equivalent to increasing the pressure within the compression compartment. If the flow of pressure medium inward into the compression pocket is simultaneously restricted, an unduly large pressure potential would be built up therein. According to the present invention the bearing is now arranged in such a way that a simultaneous opening or enlargment of the inlet restrictor gap to the compression pocket also takes place. This restrictor gap is arranged at the point where, due to the shift between the shaft and housing there is a natural or physical increase in the distance or space between the housing and shaft forming the gap. As a result the flow resistance to the compression pocket of the pressurized fluid from the supply is thereby reduced. This results in a smaller pressure gradient at the restrictor gap which must likewise be equated with an increase of flow of fluid medium thereto. Since on the opposite side of the shaft and bearing the reverse process is taking place, the compression pocket at that point, is unstressed and the pressure therein falls very quickly allowing the bearing to exert a force on the shaft contrary to that exerted by the load.

With the principle according to the present invention very small movements between the shaft and the housing can produce very great pressure differentials between the stressed or compressed side of the bearing or the unstressed or uncompressed side of the bearing. In this manner it will be observed that the bearing comprising the housing and the shaft in combination defines a choke or throttling valve at each of the restrictor entrance gap and the discharge outlet gap by which the passage of fluid is regulated in direct response to load conditions. The choke or throttling valve is integrated within the bearing in the simplest manner possible by being formed of the actual surfaces of the shaft and/or housing. In accordance with this principle, it is possible to produce all forms of fluid bearings either hydrostatic or aerostatic for absorbing radial, axial, conical, spherical, combined and complete spindle bearings, etc.

Bearings for receiving axial loads according to the present invention are characterized by the fact that the throttle control means is formed with one or more annular disks attached to the shaft or formed integrally therewith so as to be conjointly rotatable with it. The disks extend with a small degree of freedom or play in a conforming recess formed within the housing. The housing and/or disks are formed with bearing compression pockets and the opposing respective housing and shaft or disk surfaces form the restrictor gaps or discharge gaps. In response to an axial load placed on the shaft the opposing gaps are respectively increased and reduced simultaneously and automatically until a state of equilibrium or balance is achieved.

These bearings may also be designed to receive loads acting in both axial directions and have compartments arranged on both sides of the disk. Distributor inlets are provided in the housing or the disk or the shaft in a number corresponding to the number of compression pockets. The individual inlets are connected to individual compression pockets by a duct or conduit so that an inlet is connected to its diametrically opposing perspective compartment. In practical form, the distributor inlets may be arranged in the disks and the ducts leading to the respective pocket can extend through the disk. Such models are suitable for applications in which the housing rotates and the shaft itself is stationary. In this condition where the housing is rotatable it is preferable that the supply of pressure medium is delivered through a bore or conduit made through the shaft and disk itself.

For bearings which are intended to take up radial loads, the control devices by which the restrictor and discharge gaps are altered in size may comprise one or more disks having an angular or T-shaped longitudinal cross-section. Such a disk is attached at its stem to the shaft. The transverse disks of the arm enter into a conformingly T-shaped or angular shaped annular recess provided in the housing and form with the latter restrictor gaps which extend in a longitudinal or axial direction. The bearing discharge gaps are preferably formed in the well known manner by the "bridges" or web members, bounding or defining the bearing compression pockets and the surface of the shaft opposite these bridging web members.

A varient of this latter bearing adapted to receive radial loads, comprises a housing equipped with a plurality of bearing compression pockets distributed over the periphery of its inner surface. An annular chamber is formed in the housing communicating with the inlet for the supply of the pressurized medium and with a plurality of distributor inlet points communicating with the respective restrictor gaps. The number of distributor inlet ports corresponds to the number of bearing compression pockets and are connected to the restrictor gaps of the latter by a duct which ends on the side diametrically opposite to the respective distributor inlet. This model can be modified so that it is not the housing but the shaft that is provided with the bearing compartments. The ducts for connecting the bearing compression pockets with the distributor inlets are then formed through the shaft itself.

The bearings according to the present invention have the advantage that their rigidity is improved about 100% and their carrying capacity by about 40% over the known bearings described earlier. Furthermore the quantity of pressurized medium that is needed per unit of time, it up to half as much. In this way the pump drive performance can be considerably less, proportionately. The bearings according to the present invention for simple in design and therefore simple to make, not least because they only require simply supply installation for the pressurized media. Only one pump and one supply conduit is necessary to supply the entire bearing. It may finally be mentioned as an advantage that an exact calculation of the bearing design is relatively simple and may be obtained by purely mathematical means.

Full details of the present invention are given in the following description of its preferred embodiments and are detailed in the accompanying drawings.

BRIEF DESCRIPTION OF THE DRAWINGS

In the drawings:

FIG. 3 is a longitudinal sectional view of the bearing system for radial load conditions embodying the present invention, FIGS. 3A and 3B are sectional views of the bearing system of FIG. 3.

DESCRIPTION OF THE PRESENT INVENTION

Figure 1:
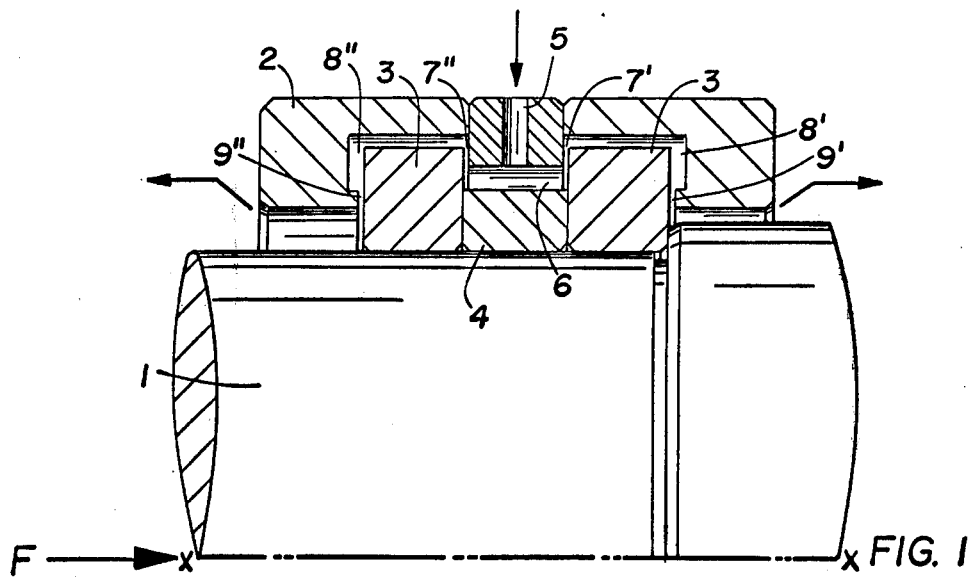
FIG. 1 is a longitudinal sectional view of a bearing system for axial load conditions embodying the present invention.

In general the bearings formed in accordance with the present invention employ conventional features well known to those skilled in the art and as such these conventional features are not detailed herein. Amongst those details are the form of the bearing housing, the construction of the compresion pockets, the pump for supplying fluid pressure and the source of fluid which may be either oil, lubricant, air or the like. Other conventional features will be obvious to those skilled in the present art and reference may be made to any one of the aforementioned systems for such details if they are necessary. In the accompanying drawings all of the Figures bear similar reference numerals to depict similar parts both in structure and function.

The bearing depicted in FIG. 1 serves for the axial support of a rotatable shaft mounted to rotate about its axis X—X. The shaft 1 is journalled within an annular sleeve like housing 2, which housing has a generally U-shaped longitudinal cross section. The shaft is provided with two disks 3 which are integrally formed or securely welded or otherwise fastened to the shaft so as to be conjointly rotatable with it with respect to the outer housing 1. The disks 3 are spaced apart axially by a spacer ring 4 which extends radially outward to a lesser distance than the disks 3. A radial bore 5 is formed in the housing 2 and serves as a conduit for the passage of a pressurized medium supplied by a pump (not shown) into the annular space 6 formed between the two disks 3. The housing 2 is formed with a central inwardly directed ring like member through which the bore 5 is formed. The ends of the disks 3 facing one another form with the opposite sides of the inwardly directed central ring portion of the housing a pair of annular restrictor gaps 7 extending in a radial direction. Through these restrictor gaps 7 the pressurized medium passes into the bearing compression pockets or compartments 8 which are formed on the inner surface of the housing 2. Bearing discharge gaps 9 are formed between the ends of the disk 3 and the surfaces of the ends of the U-shaped arms of the housing 2 opposite the latter. The discharge gaps 9 extend also radially. The pressurized medium thus flows from the annular space 6 through the restrictor gaps 7 into the compartments 8 and outwardly in the direction shown by the solid black arrows. As seen in FIG. 1 the embodiment shown provides right and left hand opposed compression pockets 8, restrictor gaps 7 and discharge gaps 9 each denoted by the superscripts ' and ", resepectively.

Under stabilized operation the shaft 1 takes a normal balanced or equilibrium position within the housing 2 and the pressurized medium passes through the bore 5 without any appreciable falling of its pressure. The medium passes into the annular chamber 6. Due to the resistance created by the restrictor gap 7, the pressure medium is reduced in pressure to that of the pressure stabilized within the bearing compression pocket. This pocket pressure is varied according to the restrictor conditions i.e. the size of the restrictor gap. A further fall in pressure to a zero potential takes place at the discharge gap 9 which provides a further resistance to the outward flow of the pressurized medium. If, however, the shaft 1 is axially loaded from without, for instance by means of a force acting to the right, as shown by the arrow F, in FIG. 1, the shaft 1 with its two disks 3 is shifted to the right in the direction of this force F. Through this shift, the right hand discharge gap 9' is reduced and the right hand restrictor gap 7' corresponding to it is simultaneously enlarged. At the same time the left hand restrictor gap 7" is reduced and the left hand discharge gap 9" is enlarged. This variation in the restrictor gaps 7 and the bearing gaps 9 at opposing ends of the direction of load influences the restrictor resistances and the bearing resistances within the compression pockets 8 to the third power ($X^3$). This is done in such a way that the inlet restrictor resistance of the compression pocket 8' is greatly reduced while the discharge resistance of the same bearing pocket 8' through a reduction in the bearing discharge gap 9' is greatly increased. This variation in the ratio between the restrictor resistance and the discharge resistance brings about a speedy increase of pressure in the right hand bearing compartment 8'. Conversely, the restrictor resistance increases and the discharge resistance of the left hand compression pocket 8" decreases, so that the pressure in the latter falls quickly. With the bearing arrangement just described very slight axial movements of the shaft produce very high pressure differences between the left and right hand bearing compartments 8. These pressure differences cause the forces within the bearing to counteract the external axial force F, thus causing the shaft to counteract against this force until a state of balance or equilibrium is achieved.

The present arrangement thus provides an automatically operable choke or throttling valve at both the inlet and outlet to each of the compression bearing pockets which is automatic and simultaneously operable merely by the relative movement between the shaft and the housing. It will be observed that the operation of the choke or throttling means is the same with an axial force even directed contrary to the arrow F as seen in FIG. 1 since compression chambers are provided on either side of the disks 3.

Figure 2:
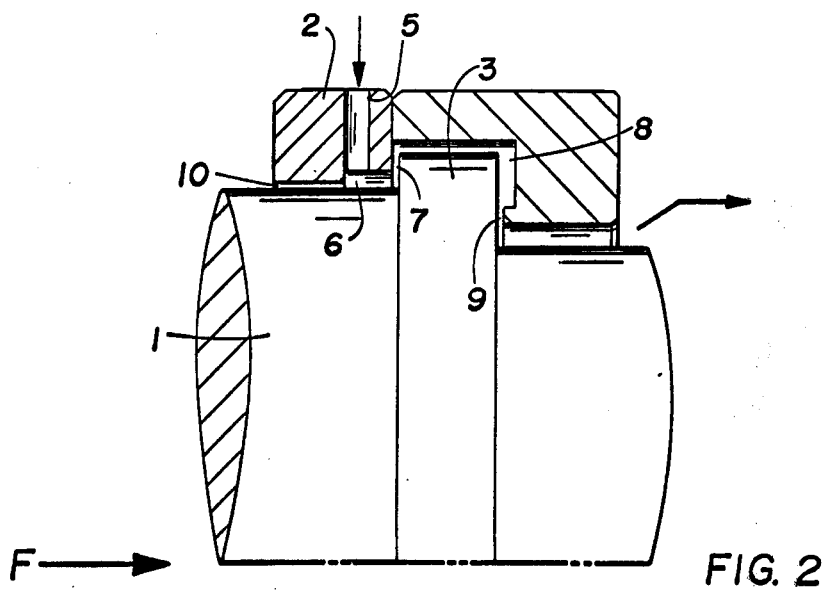
FIG. 2 is a view similar to that of FIG. 1 showing a modification of the embodiment of FIG. 1.

The varient represented in FIG. 2 is suitable for receiving axial loads created in the direction indicated by the arrow F only, because only one side of the disk 3 is provided with compression bearing pockets. The pockets in this embodiment are uniformly distributed about the periphery of the shaft on the inner surface of the housing facing the frontal edge of the disk 3. In this model, the pressure medium passes through a bore 5 in the housing 2 arranged on the opposite side of the disk 3. An annular shaped space 6 is provided on this opposite surface of the disk 3 from whence the pressurized fluid is able to flow outwardly via the restrictive gap 7 formed between the side of the disk opposite to the compression pockets 8 and the portion of the housing which it faces. The bearing discharge gap g is formed on the outward side of the compression pockets 8 between the corresponding face of the disk 3. Sealing of the annular space 6 from the outside is made by the use of a narrow angular gap 10 between the housing 2 and the surface of the shaft 1. In this embodiment, a shift of the shaft 1 in the direction of the arrow F causes a reduction in the bearing discharge gap 9 and at the same time an increase of the restrictor gap 7, whereby pressure in the bearing compression pocket 8 rises to counteract the external load causing the movement in the direction F. While the embodiment of FIG. 2 is useful only to absorb axial loads in one direction, it will be observed that it operates in exactly the same manner as the embodiment shown in FIG. 1.

The bearing according to FIG. 3 is mainly intended to receive forces acting in a radial direction although it can also receive forces acting on the shaft to create angular moments. In this embodiment a single disk 3 having a T-shaped longitudinal cross section is fixed on the shaft. The transverse extending arms 11 of the disk 3 are located on a correspondingly formed angular recess 12 cut within the housing 2. The arms 11 and the surfaces of the conforming recess 12 are designed so that a degree of space is provided between the two allowing for the relative rotation of the shaft with respect to the housing 2. These surfaces form two generally horizontal or axially directed restrictor gaps 7. The housing interior surface facing the shaft 1 is provided with two annular rows each containing a plurality of compression pockets 8. The pockets 8 are uniformly distributed about the periphery of the shaft 1. The pockets 8 are further formed by cutting out the surface of the housing 2 leaving bridging or web portions 13 which bound the pockets 8. These web portions are spaced from the surface of the shaft 1 a lesser distance than the pockets 8 and thus form the discharge gaps 9 leading outwardly from the compression pockets 8. To prevent equilization of pressure within adjacent bearing compartments or pockets 8 the region of the bridges or web portions separating the bearing compartments (shown in dotted lines) are extended spaced therefrom. Leaving a gap between the bridges and the shaft 1 of the same size as the gaps 9.

In the embodiment of FIG. 3 the pressurized medium passes, as in the embodiments previously described, through the bore 5 into the annular space 6 formed between the central portion of the housing 2 and the radially outer surface of the disk 3. Thence it flows via the restrictor gaps 7, at which time the pressure falls to that of the compression pockets pressure, into the compression pockets 8 arranged on either side of the disks 3. From each of the compression pockets 8 the medium flows outwardly without any pressure through the bearing discharge gaps 9. In the event the shaft 1 is stressed by a radial force extending in the direction of the arrow F of FIG. 3, the shaft 1 is moved radially. As the shaft moves radially there is a corresponding enlargement of the restrictor gap 7 on the stressed side of the bearing, in the drawing shown at the top. At the same time the bearing discharge gaps 9 are reduced. The restrictor gaps 7 and the bearing discharge gaps 9 bring about on the stressed side of the bearing an increase in pressure within the bearing compartments 8. Simultaneously in the corresponding but opposite manner the pressure drops in the diametrically opposite bearing compartments 8, i.e. the lower bearing compartments not shown in the drawing. Thus the external force F, acting in a radial direction is counteracted by an opposing force created by the increase of pressure in the corresponding compression compartments 8. In this radial load absorbing bearing it will be noted that the restrictor gaps 7 and the discharge gaps 9 are arranged in the horizontal or axial direction.

FIG. 3 shows a bearing in which each row of compression pockets contain four bearing pockets. In FIG. 3A it will be observed that this arrangement can be modified so that more than four bearing compression pockets 8 are provided. As seen in FIGS. 3A and 3B, the inner surface of the housing may be, for example, provided with twelve compression pockets 8 each of which have a cross sectional form of that of a segment of a circle. The pockets may be formed by milling or otherwise machining the inner surface of the housing. The larger the number of bearing compression pockets 8 the more uniform a distribution of bearing rigidity can be obtained about the periphery of the shaft. In the form shown in FIGS. 3A and 3B, the varient is not more expensive than that shown in FIG. 3 because for all twelve bearing compartments, only one common restrictor gap 7 is provided. The restrictor gap is annular and feeds all of the housing pockets simultaneously. FIG. 3A and 3B further shows how the bridging or web portions of the housing between each of the pockets is formed so as to isolate the adjacent pockets from each other.

Figure 4:
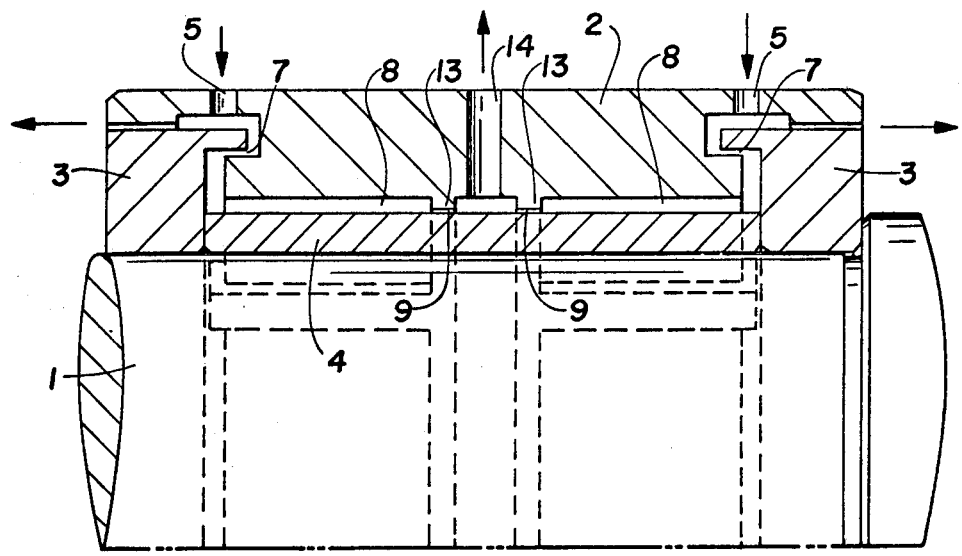
FIG. 4 is another bearing system for radial loads.

A modification of the bearing described with respect to FIG. 3 is shown in FIG. 4. In the embodiment of FIG. 4, the disk 3 is not T-shaped and is not arranged in the middle of the housing. The disk however, in this embodiment is split and is provided at each of the ends of the housing. Each of the disk portions has an axially extending flange-like annular extension pointing into a conforming recess formed in the frontal edge of the housing. The bearing compression pockets 8 are formed on the inner surface of the housing 2 and face a cylindrical spacing ring 4 arranged between the disks 3. The disks 3 and the spacing ring 4 are welded or otherwise firmly secured together and to the shaft 1 for conjoint movement with it relative to the housing 2. Thus the compression pockets 8 are defined by the housing 2 and the spacer 4 rather than with the disks or with the shaft. The supply of pressure medium is made via a pair of bores 5 leading directly into annular spaces formed about the restrictor openings 7. The bores 5 are commonly connected to a single pump. The discharge gaps 9 are formed by the juxtaposition of the web portions 13 spaced only a short distance from the surface of the spacer ring 4 and the outward flow of fluid proceeds through a duct 14 made through the central portion of the housing 2. The pressurized medium supplied through the bores 5 flows in much the same manner as previously described in accordance with FIG. 3, via the restrictor gaps 7, into the respective bearing pockets 8 and thence via the bearing discharge gaps 9 into the discharge bore 14 leading radially outward. The discharge bore 14 is in communication with an annular groove formed in the housing 2 surrounding the spacer ring 4. The method of action of the bearing shown in FIG. 4 is largely the same as that for the bearing according to FIG. 3, in response to a radial force placed on either the bearing or the shaft. Further description is not believed necessary since reference can be made to FIG. 3.

Figure 5:
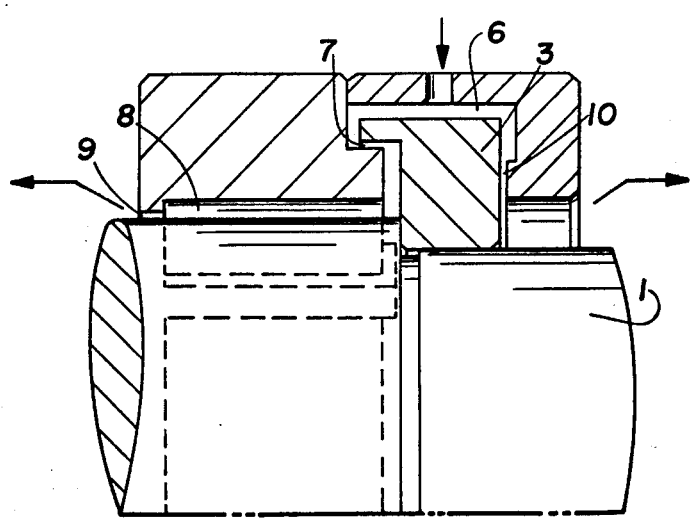
FIG. 5 is still another bearing system for radial loads.

A further varient or modification of the radial bearing is shown in FIG. 5. In this construction the two sided or double ended arrangement wherein two restrictor gaps are formed is modified so that only the right hand half is provided. Only one series of bearing pockets 8 is provided. The pressurized medium supplied to the circular chamber 6 not only flows through the restrictor gap 7 into the bearing compartments 8 and thence via the discharge gaps 9 outwardly to the exterior but flows also via a sealing gap 10 which is provided on the side of the angular disk facing away from the bearing pockets 8. By this measure the shaft 1 is guided in two axial direction since the sealing gap 10 also acts like a restrictor gap. It must be furthermore emphasized that much as in FIGS. 3 and 4, the bearing compression pockets 8 are horizontally directed or axially directed in a parallel direction to gap 7 and each is bent radially outward to comunicate with an adjoining portion of the restrictor gap 7 so that in the event radial shifting of the shaft 1 is caused by an external load, a pressure is caused to prevail in each of the bearing pockets 8 corresponding to the restriction in the adjoining part of the restrictor gap 7. The radially extending gaps or annular spaces between the restrictor gaps 7 and the bearing compression compartments 8 remain constant on movement of the shaft in the radial direction, so that variations in pressure are not affected by movement of the fluid through such gaps.

Figure 6:
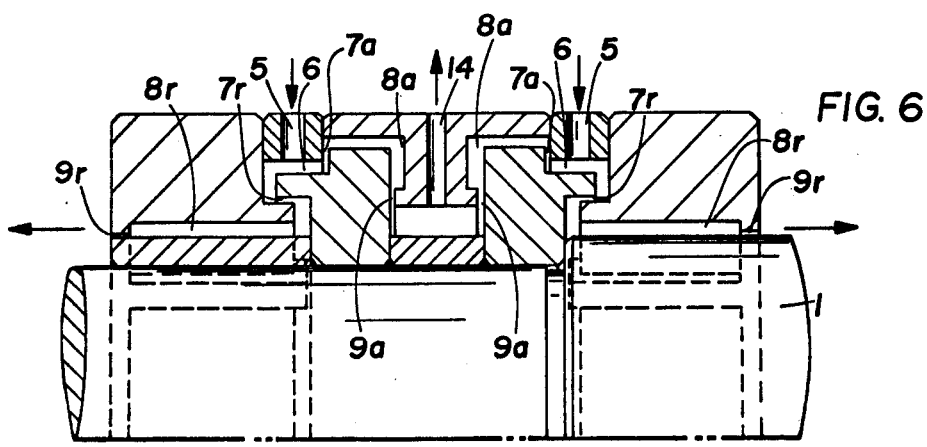
FIG. 6 is a bearing system for radial and/or axial load conditions.

In the fluid bearing shown in FIG. 6 both radial and axial loads can be absorbed. The device shown in FIG.

6 is a combination of an axial bearing similar to that shown in FIG. 2 and a radial bearing similar to that shown in FIG. 4. In this embodiment, both the radial and axial bearing portions have two rows of bearing compression compartments 8, two inlet bores 5, symmetrical to the discharge outlet 14. The discharge outlet 14 is provided in the middle of the housing of the bearing system. After the pressure medium has entered both the annular chambers 6 after the inlet bores 5 it flows partly via the restrictor gaps 7r (radial) into the radial bearing comression pocket 8r and also via the restrictor gaps 7a (axial) into the axial bearing compression pockets 8a. From the radial bearing pockets 8r, the pressurized medium flows away through the bearing discharge gaps 9r. From the axial bearing compartments 8a, the pressurized medium passes via the bearing discharge gaps 9a into the discharge bore 14. Otherwise the housing and shaft 1 and the attendant parts are formed similarly to the embodiments previously described and function in the same manner.

Figure 7:
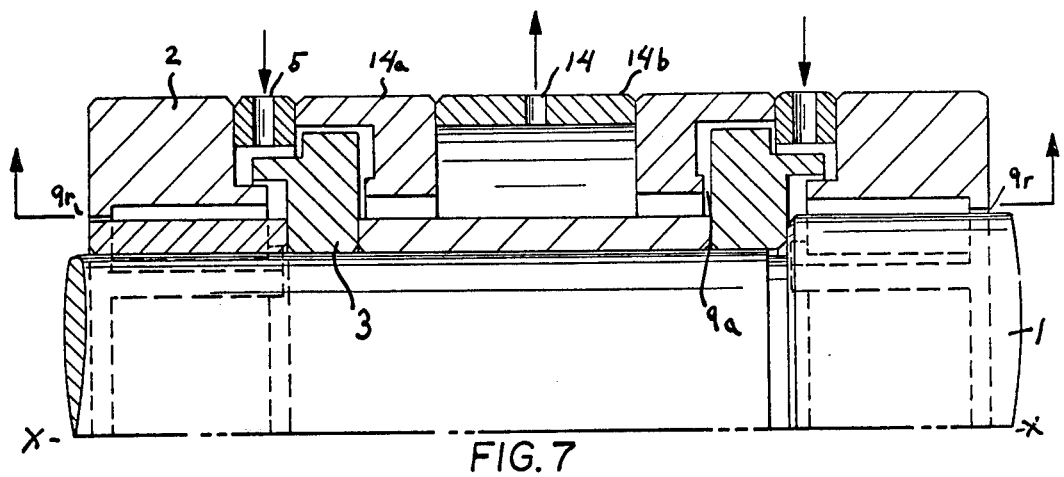
FIG. 7 is still another embodiment for axial and/or radial load conditions.

Turning to the embodiment of FIG. 7, the embodiment previously described in connection with FIG. 6 is varied by providing a greater spacing within the compression portions so that it is possible to take up larger angular moments. Both of the bearing according to FIG. 6 and that according to FIG. 7 act in the same way as that already described and represented in detail. The bearing differs generally in that the central portion in which the outlet bore 14 is made is provided by two annular spaced members 14a separated by an annular spacer 14b in which the discharge bore 14 is provided. Thus a shaft of the shaft 1 in a radial and/or axial direction on account of an external force brings about, irrespective of the direction of the force, an enlargment or reduction of the restrictor gaps 7 and the bearing discharge gaps 9. This causes an increase in the bearing compression pocket pressure on the loaded side of the bearing at a reduction thereof on the unloaded side as previously described. Because of the axial elongation of the bearing and the enlarged space prior to the outlet opening 14, larger angular moments are more easily absorbed.

Figure 8:
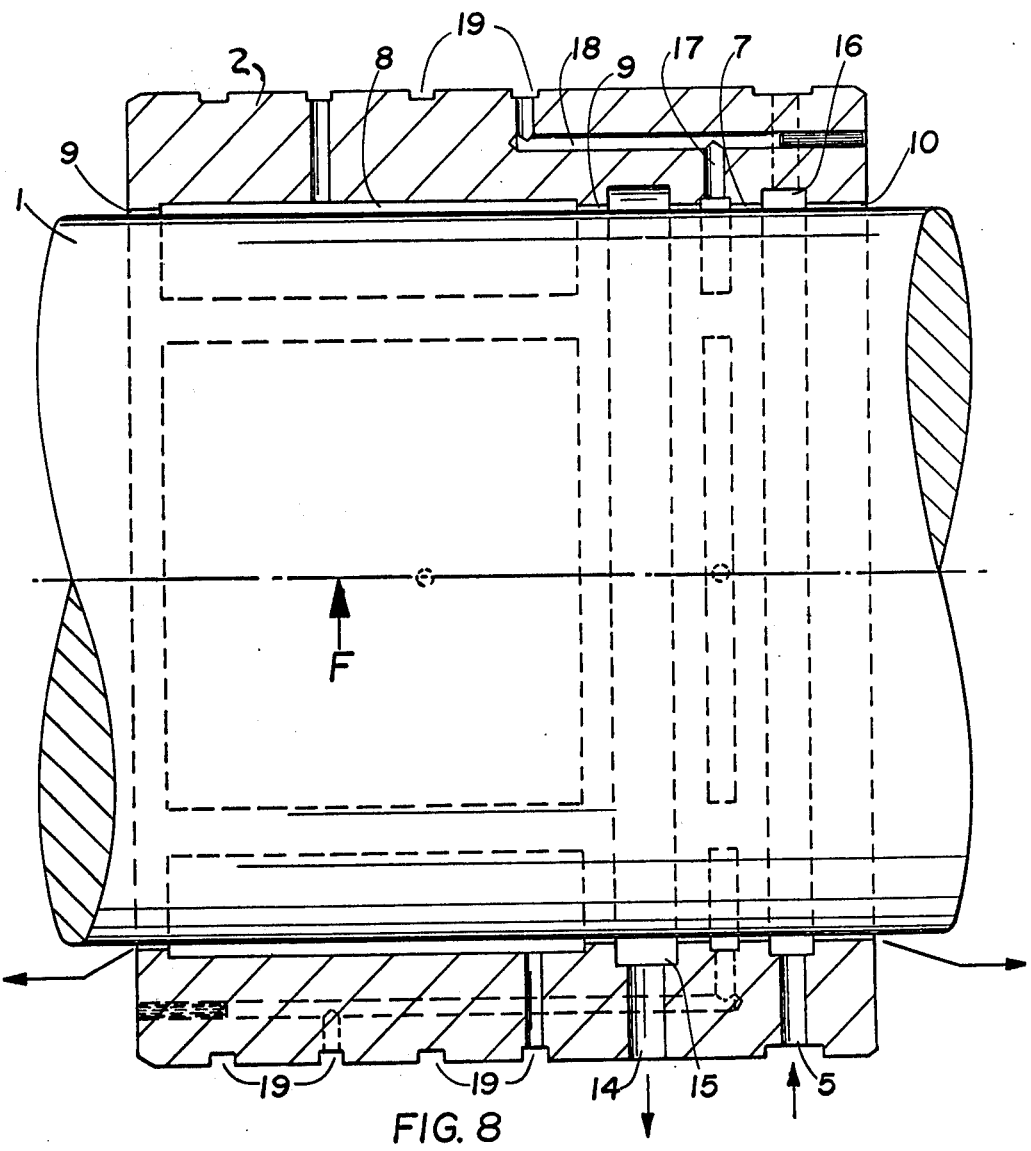
FIG. 8 is still another embodiment of a system for radial load conditions embodying the present invention.

Another form of the fluid bearing according to the present invention is shown in FIG. 8. This bearing serves to receive radial loads. In contrast to the radial bearings according to FIGS. 3–5, no disk 3 is needed for regulating the restrictor and bearing discharge gaps 7 and 9, respectively. Instead the shaft 1 is smoothly formed. The inner surface of the bore of the housing 2 is provided with a row of bearing compression pockets 8 which are uniformly distributed about its periphery. The pressurized medium can flow away on both axial sides through the bearing discharge gaps 9 outwardly on the left hand side about the shaft 1 or on the right hand side through an annular groove 15 and radial discharge outlet bore 14. Pressurized medium is supplied through a radial bore 5 which terminates in an annular chamber 16 formed in the interior surface of the housing 2. The annular groove 16 is sealed from the outside by a sealing gap or sealing means 10 arranged between the housing 2 and the shaft 1. A plurality of distributor inlet spaces 17 are arranged between the annular groove 16 and the annular outlet groove 15. The number of inlet spaces 17 corresponds and are arranged conformingly to the number of compression pockets 8. The outer housing 2 is provided with an inwardly directed surface which defines with the surface of the shaft 1 a restrictor gap 7 which allows for the flow of the pressurized medium between the inlet groove 16 and each of the inlet distributor spaces 17. From each distributor input space 17 a duct 18 passes to the compression pocket 8 which is diametrically opposite to the respective distributor inlet 17. For this purpose as may be seen from the upper part of FIG. 8, each duct 18 ends in an annular groove 19 formed in the outer surface of the housing 2. This groove 19 is connected on the opposite side with the corresponding bearing compartment 8 as will be obvious from the lower portion of the FIG. 8.

If the shift 1, due to an external radial stress force F, is shifted in the direcion of this force i.e. upwards and the showing of FIG. 8, the bearing discharge gaps 9 on either of axial side of the compression pockets 8 are thus reduced so that the discharge of the pressure medium from this bearing compartment 8 (in the example, the upper one) if restricted. At the same time, this radial shifting of the shaft 1 in the direction of the force F also produces a reduction in the restrictor gap 7 lying in the radially corresponding position of the compression pocket 8 (that is, the upper portion of the FIG. 8) so that the supply of pressurized medium to the adjoining distributor input 17 is restricted. Thus the diametrically opposite (i.e. lower) bearing compression compartment 8 communicating with the restricted inlet compartment 17 is restricted. This decreases the pressure in the compartment 8 on the lower portion of FIG. 8 is diametric opposition to that of the compressed compartment in the upper portion allowing for a balancing force to act on the shaft 1. The reverse process takes place on the opposite or unstressed side of the bearing (lower portion of FIG. 8) so that the outer load force F is successfully absorbed and taken up in the bearing. The execution of the radial bearing according to FIG. 8 has the advantage in that it may be easily manufactured since it requires only milling and machining of the housing 2 and does not require constructional change in the shaft 1. However, the quantity of pressurized medium flowing through the bearing and therefore the necessary pump performance are rather greater than those embodiments previously described.

To avoid losses due to leakage through the sealing gap 10 of the embodiment of FIG. 8, it is desirable to provide a housing which is symmetrically formed to either side of the inlet groove 16 with duplicate sets of compression pockets 8, restrictor gaps 7 and discharge gaps 9. In this manner instead of a sealing gap 10 there would be a second set of restrictor gaps 7 through which the pressurized medium passes to a second row of distributor inputs 17 and thence to a second row of pressure pockets 8. Pressurized fluid would then pass axially out of the discharge gaps 9 about the shaft 1 or through the second discharge outlet 14.

Figure 9:
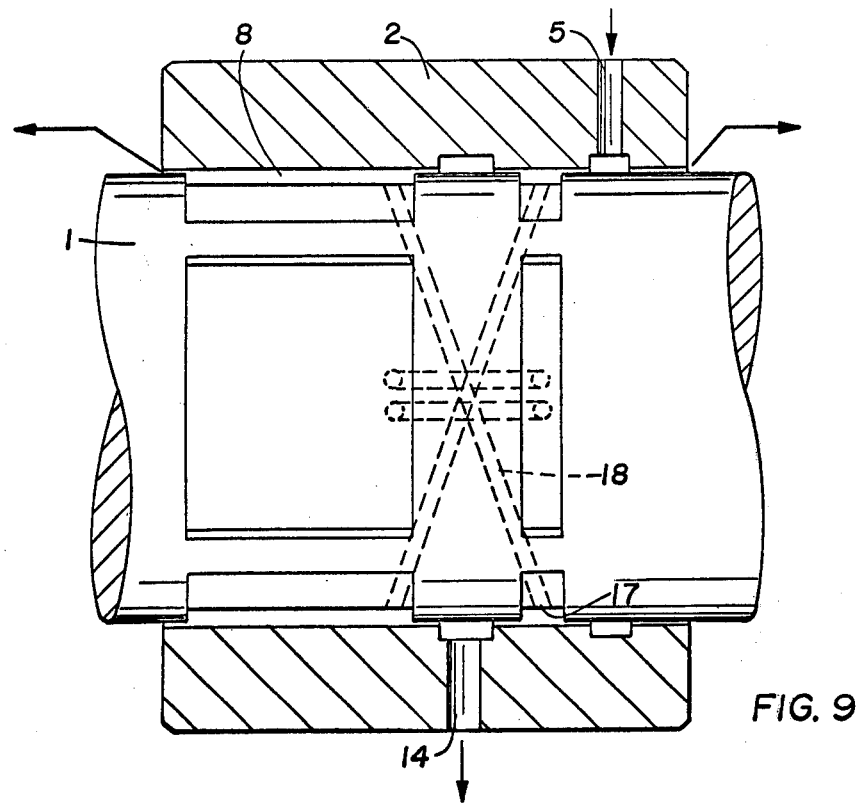
FIG. 9 is yet another system for radial load conditions.

The embodiment shown in FIG. 9 differs from that of FIG. 8 mainly in that the bearing pressure pockets 8 are not provided in the housing 2 but within the outer surface of the shaft 1 itself. In this form it is also necessary for the distributor inputs 17 and the corresponding cross ducts 18 which connect the respectively opposite bearing pressure pockets 8, to be formed directly through the shaft 1. In other respects the method of operation of this embodiment does not differ from that of FIG. 8. If the shaft in FIG. 9 is stationary and the housing 2 is made to revolve about it, the supply of pressurized medium must also take place through the fixed shaft 1. This merely requires the kinematic reversal of the functioning of parts so that the inlet bore 5 extends directly through the shaft 1, etc.

Figure 10:
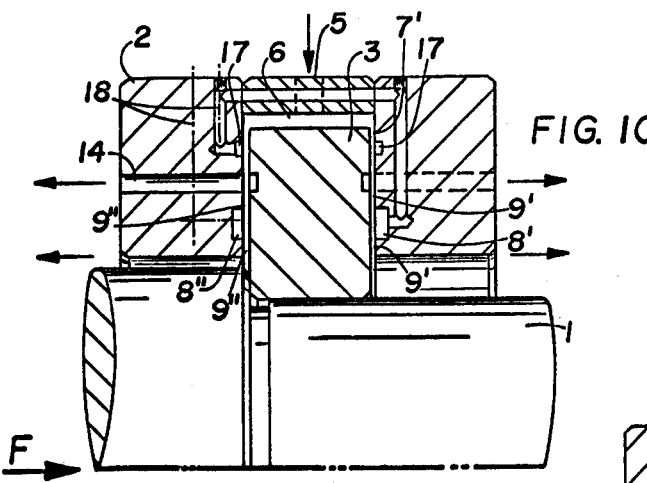
FIG. 10 is still another system for axial load conditions.

As may be seen from FIG. 10, the principle represented in the embodiment of FIG. 8 is applied to a hydro- or aero static axial bearing. The bearing is suitable for taking up loads acting in both axial directions. For this purpose, bearing pressure pockets 8 are arranged on each side of the housing 2 facing the disk 3 which is secured to the shaft 1. Each pressure pocket 8 is connected as in the form of execution shown in FIG. 8 by ducts 18 with a distributor inlet 17 on the opposite side of the disk 3. The pressurized medium reaches the distributor inlets 17 through the inlet bores 5, the annular space 6, via the restrictor gaps 7 formed between the frontal faces of the disk 3 and the opposing surfaces of the housing 2. From the bearing pressure pockets 8 the pressurized medium flows outwardly through the bearing discharge gaps 9 which are coradial with the restrictor gaps 7, either through the outlet 14 or through the annular gap between the inner bore of the housing 2 and the opposing shaft 1.

In the event the shaft 1 is axially stressed by a force F, for instance in the direction of the arrow shown in FIG. 10, the shaft 1 with its integrally formed disk 3 moves correspondingly. In the drawing to the right. In this manner, the bearing discharge gaps 9 of the stressed or compressed pockets 8 are reduced and the flow of pressure medium outwardly from the bearing is restricted. In the same way there is a reduction in the restrictor gaps 7'on the compressed (right) side, so that the supply of pressure medium to the unstressed (left) bearing compartments 8''is restricted. The corresponding reverse operations take place on the unstressed side of the bearing much in the same manner as previously described with the earlier embodiments.

Figure 11:
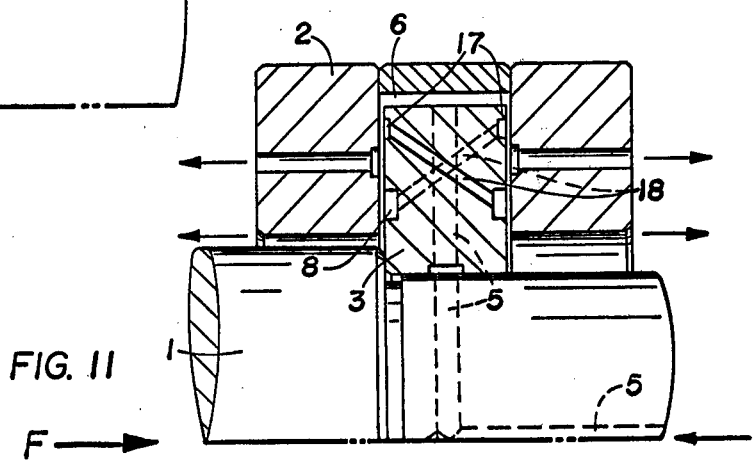
FIG. 11 is yet a final embodiment of the present invention for axial load conditions.

Finally, in FIG. 11 a varient is shown of the embodiment of FIG. 10. In this varient the bearing is also suitable for taking up axial loads and is intended for applications in which the housing 2 rotates and the shaft 1 is stationary. The pressurized medium is supplied through the inlet bore 5 in the stationary shaft 1 and through the radially outwardly extending disk 3 which is secured to the shaft. The pressurized medium flows into the annular chamber 6 from thence following the course described in connection with FIG. 10. A further difference resides in the fact that the bearing pressure pockets 8 and the distributor inlets 17 are provided within the faces of disk 3. Likewise ducts 18 for connecting the distrbutor inlets 17 with the opposite bearing pockets 8 is also provided in the disk 3. The method of operation of this bearing corresponds to that represented and described in FIG. 10.

It will be observed from the foregoing that in accordance with the present invention there is provided a simple system by which a fluid bearing, employing either a hydrostatic or aerostatic pressurized supply is provided with control means by which the introduction and exiting of fluid into the respective compression chambers can be automatically and simultaneously regulated to provide a balancing force counteracting either axial or radial load shifting conditions. The present invention is adaptable for those situations in which either the shaft or the surrounding housing are rotatable and for absorbing combined radial and axial loads. Various modifications of various forms and embodiments have been shown, others will be obvious to those skilled in the art. It is accordingly intended that the present disclosure be taken as illustrative only and not as a limiting of the present invention.

In order to prevent a pressure equilization between adjacent compression pockets of each of the described embodiments there are web portions separating the pockets from each other as it is known in the art.

The pumps for supplying fluid under pressure to the bearings according to the invention may be of any conventional feature as for example plunger pumps or gear type pumps. The only condition is that the pressure which is delivered to the bearing is always constant.

What is claimed is:

1. A fluid bearing for a shaft comprising an annular housing located about said shaft, said housing and said shaft defining at least one fluid compression pocket distributed about the periphery of said shaft, an inlet for the supply of fluid under pressure to said compression pocket and control means for regulating the flow of pressure to and form said pockets comprising an annular recess formed within said housing, an annular disk integral with said shaft and extending into said recess, said recess and said disk having conformingly longitudinally extending portions, the radially opposing surfaces of said longitudinal portions forming restrictor inlet openings, said housing having a radial surface opposing said shaft forming discharge openings, said restrictor inlet and discharge openings being simultaneously varied relative to each other in the opposite direction as a function of the size and distribution of the load thereon.

2. The bearing according to claim 1 wherein said recess and said disks are T-shaped in longitudinal cross section.

3. The bearing according to claim 1 wherein one of said housing and said shaft is formed with two spaced apart annular rows of compression pockets uniformly distributed over the periphery thereof.

4. The bearing according to claim 3, wherein said housing is provided with recesses at axial ends of said annular rows of compression pockets and two disks are provided extending respectively into said recesses at each end.

5. The bearing according to claim 1 wherein said disk is arranged between rows of compression pockets and said housing is formed with a recess receiving said disk.

6. The bearing according to claim 5 wherein said housing includes bridging members defining said pockets and separating the same, said bridging members having a surface lying in a common arc opposite said shaft.

7. The bearing according to claim 1 wherein each of said fluid compression pockets are formed by a plurality of spaced compression chambers uniformly distributed about the periphery of said housing.

* * * * *